April 12, 1949. F. J. VAUPEL 2,467,279
CHAIN TOOL
Filed May 13, 1946
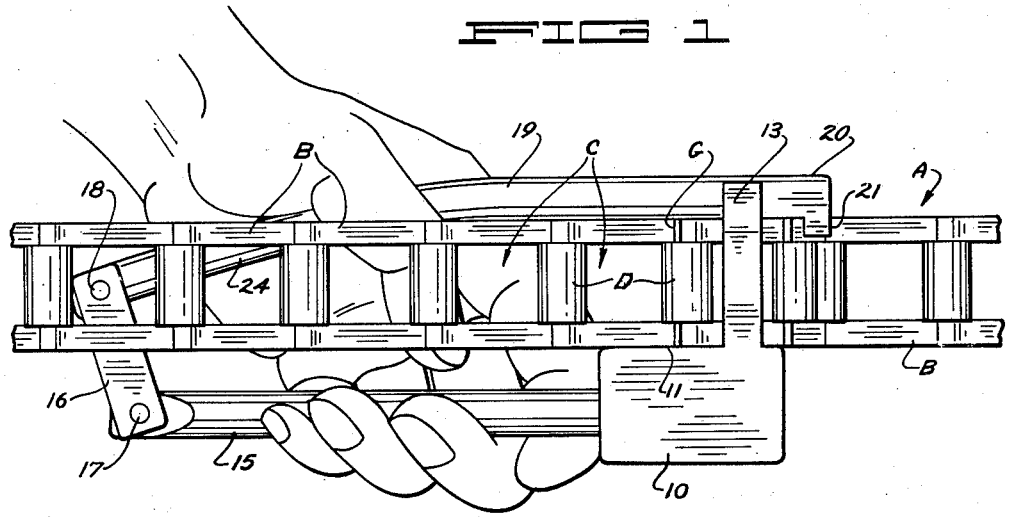
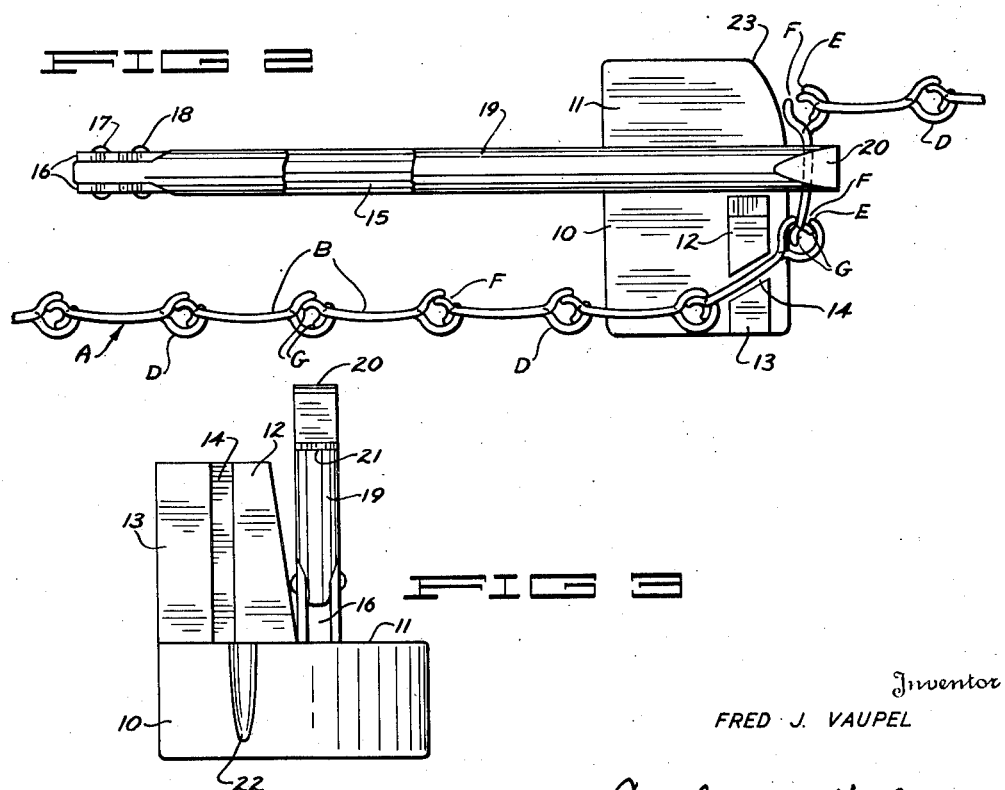
Inventor
FRED J. VAUPEL
By Carlsen + Hagle
Attorney Patented Apr. 12, 1949

2,467,279

UNITED STATES PATENT OFFICE 2,467,279

CHAIN TOOL

Fred J. Vaupel, Lake Crystal, Minn.

Application May 13, 1946, Serial No. 669,418

6 Claims. (Cl. 59—7)

This invention relates to improvements in chain tools and the primary object is to provide a tool by means of which a chain may be readily disconnected or connected, either in initially installing it on or removing it from the associated sprockets, or for the removal of links in adjusting the chain.

The tool has particular use in connection with that type of chain commonly found in farm machinery and implements and which comprises a plurality of links stamped from sheet material with means at the ends for pivotal engagement with adjacent links. The links may be connected together at their ends, or separated thereat, by driving the links in a transverse direction. This is difficult to do, however, with ordinary tools, but is very readily accomplished by my invention which provides anvil means for supporting and holding one link and means for engaging the adjacent link while it is driven out, or into place, as the case may be.

Another object is to provide a tool of this character and for this purpose which is simple and inexpensive in construction, is compact and light enough to be readily carried about, and which is very convenient in use and operation.

These and other more detailed and specific objects will be disclosed in the course of the following specification, reference being had to the accompanying drawings, in which—

Fig. 1 is a side elevation of my improved tool showing it held in one hand and applied to a length of chain ready for separating two adjacent links thereof.

Fig. 2 is a plan view.

Fig. 3 is an end view, the chain being omitted.

As stated above, my invention has particular reference to a tool for working upon a certain type of chain, well known by users of farm equipment and which for convenience' sake will be hereinafter referred to as implement chain. The individual links of such chains are known as attachment links.

A section of such chain is indicated in the drawing generally at A and the links are designated B. These links are stamped and formed from sheet metal to a rectangular shape and are punched out at their centers to form openings C for the teeth of the sprockets (not shown). The material punched or formed out is rolled back toward one end, and together with the adjacent curved portion of the link ends form transverse hinge or pivot eyes D. The rolled back edges of the material E are spaced from the adjacent ends of the link forming slots F. The opposite ends of the links are also slightly curved, and together with a short section of the punched out center material at this end form transversely extending bearing or hinge tongues or ribs G. The arrangement is such that these tongues G will play in the eyes D, when the links are connected, to provide the necessary flexibility for the chain. In assembling the chain the tongues G are forced endwise into the eyes D by driving adjacent ends of the links together and then by slightly curling the edges E the slots F will be narrowed and the links will be held against lateral separation. To remove a link, or separate the chain, one link is then driven crosswise with respect to the next to force the slots F open enough to allow the links to separate.

This operation, and the one necessary to reconnect the links, is difficult with ordinary tools, particularly when the chain is on the sprockets, since one link must necessarily be firmly held as the other is driven. To do this with two hammers or other tools is disagreeable and troublesome to an extreme, as will be readily apparent.

The tool of my invention comprises an anvil or head member 10 of heavy metal and of such size and weight as suitable for its purpose. This anvil 10 has a flat upper surface 11 from one edge of which upwardly extends a pair of integral lugs or chain clips 12 and 13, the adjacent edges of which are spaced apart forming an upwardly opening chain engaging notch 14. These fingers 12 and 13 are located near a forward corner of the anvil, and rigidly secured to the anvil and extending rearwardly therefrom, in a plane offset with respect to the centermost finger 12, is a handle rod 15. Pivotally attached to the extremity of the handle rod 15 is a pair of links 16 attached by a pin or rivet 17, and between the upper ends of these links is pivoted, at 18, a gripping or hammer rod 19. The latter rod 19 extends back toward and over the anvil 10 in a position to swing up and down alongside the finger 12 and this swingable end of rod 19 is flattened on the upper side at 20 and has a depending hook 21 on its lower side. It will be noted that the slot 14 angles toward the swingable end of the rod 19 in a forward direction. See Fig. 2. The arrangement is thus such that, by swinging the hammer rod 19 upward to clear, the chain A may have one of its links B positioned in the slot 14 and the adjacent link will then be in position for engagement by the hooked end of the rod. The angularity of the notch 14 places the connection between these two links near the front side of the finger 12 and immediately adjacent the end of hammer rod 19 when it is lowered again and the hook 21 will also now hold the links with the slot F in proper position to clear the link engaged by the hammering rod.

The anvil 10 now supports one link by its lower edge, and by grasping the two rods 15 and 19 in the hand (Fig. 1) the chain will be held in place, while the flat 20 on the rod 19 is struck with an ordinary hammer (not shown) held in the other hand. The hammer blows are then effective directly upon the link B engaged by the rod 19 and it may be driven from the link held between the fingers 12 and 13. Or in assembling the chain, a link engaged by rod 19 may be driven into place in a link held between these fingers. Due to the body and weight of the anvil 10 one link will be firmly supported as the other is hammered and the action may thus be very readily carried out. The hooked end of the rod 19 prevents any displacement of the chain or tool while the operation is in progress.

As seen in Fig. 3 the forward edge of the anvil 10 is notched at 22 to clear the link being driven from the chain and also as seen in Fig. 2 the anvil projects forwardly from the fingers 12 and 13 by a short distance sufficient to support a part of the eye end of the link in the notch 14. Thus the supported link has little or no tendency to tilt on the anvil as the one engaged by the hammer rod 19 is driven out or in as the case may be. The forward edge of the anvil from the finger 12 on may be rounded off as at 23 to provide clearance for any chain links which may be attached to the link engaged by the rod 19 and which may swing in that direction.

The links 16 supporting the hammer or gripping rod 19 allow it to move endwise, as well as up and down to thus accommodate the tool to chains of any usual width. Of equal importance this movement of the rod 19 allows it to be adjusted to hold the link engaged by it at the proper angle to the one supported on the anvil so that the slot F will be properly registered with the link being driven as seen in Fig. 2. Once the links are thus relatively angled the hand grasping the rods 15 and 19 will maintain the adjustment. The rod 19 is slightly curved toward its rear end, as designated at 24, to facilitate proper gripping of the tool.

Obviously I have provided a tool by means of which chains of this type may be readily taken apart, connected or adjusted, and with much less bother than the use of ordinary tools for these purposes. The tool is also obviously simple, inexpensive and durable in construction and of such size and weight that it may be readily carried about.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a chain tool of the character described, an anvil member having a notch adapted to receive and supportably engage one link of a chain, a gripping member for engaging an adjacent link of the chain and adapted to be struck by a tool to drive the latter link transversely with respect to the link supported in said notch, and said anvil and gripping members being movably connected together by pivotally connected members adapted to be grasped in one hand to cause the anvil and gripping members to clasp the chain while the latter member is hammered by a tool held in the user's other hand.

2. In a chain tool for detaching and attaching the links of a chain of the kind described, an anvil member adapted to support one edge of one link and having means forming a notch to receive and hold said link in place, a hammer rod having means for engaging the opposite edge of an adjacent chain link and adapted to be struck with a tool to drive the last mentioned link in a direction crosswise to the link held by the anvil, said notch being angularly disposed in such manner as to angle the link held therein with respect to the link engaged by the hammer rod and in a position permitting these links to be attached to or detached from each other, and means movably connecting the anvil member and hammer rod together.

3. In a chain tool of the character described, an anvil member and a gripping member adapted to respectively engage the opposite sides of two adjacent chain links, said anvil member having spaced fingers forming a notch for engaging one of said links and said gripping member having a hooked end for engaging the other link.

4. In a chain tool of the character described, an anvil member and a gripping member adapted to respectively engage the opposite sides of two adjacent chain links whereby the links may be shifted crosswise with respect to each other by force applied to the gripping member and toward the anvil member, and links pivotally connecting the anvil and gripping member whereby they may be relatively adjusted to engage the chain links and hold them in proper positions for such crosswise movement.

5. In a chain tool of the character described, an anvil member and a swingable gripping member connected to the anvil member, said anvil and gripping members being adapted to engage the opposite lateral edges of two adjacent chain links and to support one as the other is driven transversely by force applied to said gripping members, the said anvil member having a notch to embrace the link supported thereon, and the anvil member also having an edge portion adapted to support the link immediately at its junction with the link engaged by said gripping member.

6. A chain tool for separating or connecting the adjacent links of a chain of the type described and wherein the links must be angled to predetermined relative positions in making such connection or separation, an anvil member for supporting the edge of one link, a gripping member for engaging the opposite edge of the adjacent link and adapted to be struck with a tool for driving said link crosswise to the first, said anvil member having a notch for engaging the link supported on the anvil member and said notch being angled with respect to the gripping member in such manner as to hold the two links in said predetermined positions.

FRED J. VAUPEL.

REFERENCES CITED

The following references are of record in the file of this patent:

UNITED STATES PATENTS

| Number | Name | Date |
| --- | --- | --- |
| 1,696,578 | Lippert | Dec. 25, 1928 |
| 2,379,001 | Hage | June 26, 1945 |